J. W. WEBB.
Grinding Mill.

No. 7,062.

Patented Jan'y 29, 1850.

UNITED STATES PATENT OFFICE.

JOSEPH W. WEBB, OF LEDYARD, NEW YORK, ASSIGNOR TO BENJAMIN GOULD.

MILL FOR GRINDING.

Specification of Letters Patent No. 7,062, dated January 29, 1850.

*To all whom it may concern:*

Be it known that I, JOSEPH W. WEBB, of the town of Ledgard and county of Cayuga and State of New York, have invented a new and useful Improvement in Machines for Crushing and Grinding Corn in the Ear and other Coarse Substances, and that the following is a clear and exact description of the principle and character thereof which distinguishes it from all for like purposes before known or used and the manner of constructing and using the same, reference being had to the accompanying drawings, making a part of this specification, in which—

Figure 3:
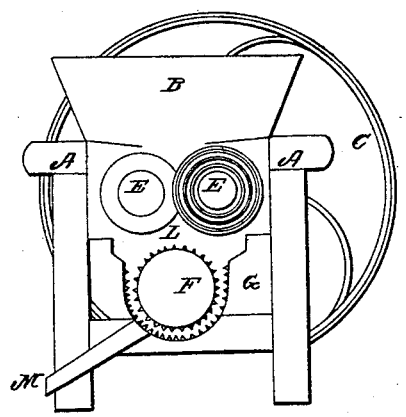
Figure 1:
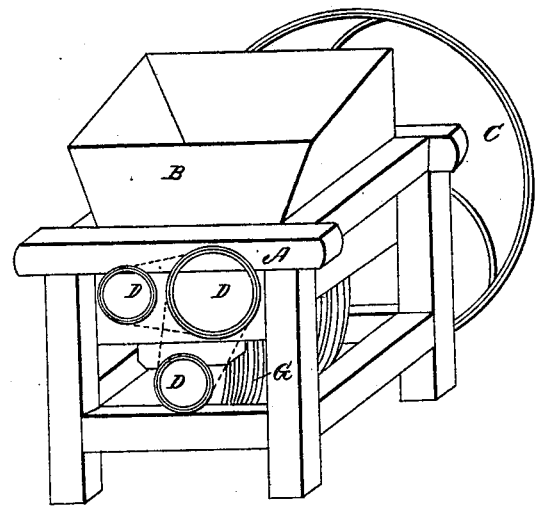
Figure 2:
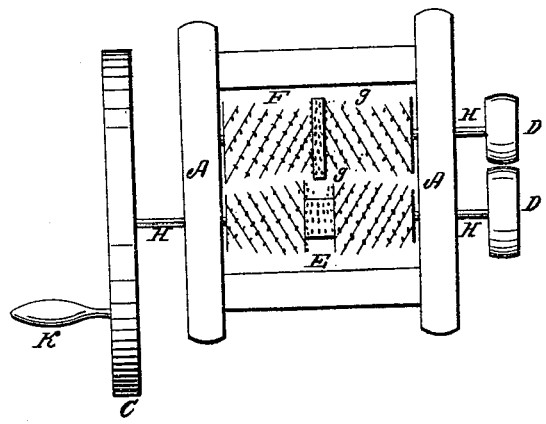

Figure 1 is a perspective representation of my machine. Fig. 2 is a transverse section with the hopper removed, showing a part of the frame A, fly wheel C, and cone screws E E. Fig. 3 is a vertical section through from side to side through the center, showing the position of cone screws E, E, and also the cylinder F, and concave G, which incloses it.

In describing the construction of my machine reference being had to the accompanying drawings, A, is the frame on which is placed the hopper B, of ordinary construction; under this hopper and attached to the top of the frame A, are two cone screws horizontally as shown at E E. In Fig. 2 one of these screws is made in two cones with their apex inverted and joined in the center to a wheel, I, of a diameter equal to the base of the cones. The other screw is made of two cones of equal size with their base turned to the center leaving sufficient space for the wheel, I, to revolve between them as shown at, J. The face of this wheel I is about two inches. I construct the cone screws of cast-iron with a V thread gathering to the center as they revolve. In the space between the base of the cones as shown at, J, in Fig. 2 I insert teeth, also in the wheel I of corresponding size to act against them.

Through each of the cone screws I pass a longitudinal shaft of wrought iron H H. On one end of these shafts I place pulleys D, D, D, one of these pulleys being double the diameter of the other. Upon the other end of one of these shafts I place the fly wheel, C, to regulate the momentum. I also cut notches in the thread of the cone screws as is shown in Fig. 2 for the purpose of more readily breaking and crushing the ears of corn. At a convenient distance directly below the cone screws I place a cylinder F, made of cast iron inclosed by concave also of cast-iron as shown at G, in Fig. 3.

On the periphery of this cylinder I construct spiral venters or rubbers which act against corresponding pieces on the inner surface of the concave before mentioned.

Having thus described the construction of my machine I proceed to give its mode of operation. When power is applied to the handle, K, or to the pulleys D, D, D, the whole machine is set in motion. One screw is made to revolve with double the velocity of the other, thereby causing the thread of this screw to cut across that of the other screw. By this action of the screws I obtain in addition to the effect produced by the notches in the thread of the screw a powerful crushing motion which readily crushes all substances to a required fineness for grinding. After passing through these screws the material to be ground passes through the conductor L, to the cylinder F, where the process of grinding is completed and the meal thus ground passes off from the cylinder F through the spout M.

What I claim as my invention and desire to secure by Letters Patent is—

The combination of the cone screws as above described with the beaters or rubbers on the cylinder substantially as described.

JOSEPH W. WEBB.

Witnesses:
 ABIGAIL MOTT,
 ELLEN M. CROCKER.